(12) United States Patent
Alonso et al.

(10) Patent No.: US 6,184,878 B1
(45) Date of Patent: Feb. 6, 2001

(54) INTERACTIVE WORLD WIDE WEB ACCESS USING A SET TOP TERMINAL IN A VIDEO ON DEMAND SYSTEM

(75) Inventors: Rafael Alonso, Cranbury; John C. Pearson, Lawrenceville, both of NJ (US)

(73) Assignee: Sarnoff Corporation, Princeton, NJ (US)

(*) Notice: Under 35 U.S.C. 154(b), the term of this patent shall be extended for 0 days.

(21) Appl. No.: 08/997,269

(22) Filed: Dec. 23, 1997

(51) Int. Cl.[7] .............................. H04N 7/10; H04N 7/00
(52) U.S. Cl. .......................... 345/327; 348/13; 348/12; 455/3.1
(58) Field of Search ............................ 345/322; 348/13, 348/12, 10, 7, 6; 455/3.1, 4.2, 5.1, 6.1, 6.2, 6.3; 382/189; 707/513

(56) References Cited

U.S. PATENT DOCUMENTS 5,884,056 * 3/1999 Steele ................................ 395/329
5,961,603 * 10/1999 Kunkel et al. ................... 395/200.47

* cited by examiner

Primary Examiner—Nathan Flynn
Assistant Examiner—Vivek Srivastava
(74) Attorney, Agent, or Firm—William J. Burke

(57) ABSTRACT

A method and concomitant apparatus for interactively accessing information from a computer network, such as a TCP/IP network, suitable for use in an interactive information distribution system, illustratively a cable television system or a video on demand system.

14 Claims, 4 Drawing Sheets

INTERACTIVE WORLD WIDE WEB ACCESS USING A SET TOP TERMINAL IN A VIDEO ON DEMAND SYSTEM

The invention relates to information distribution systems generally and, more particularly, the invention relates to a method and apparatus for interactively accessing information from the world wide web suitable for use in an interactive information distribution system, illustratively a cable television system or a video-on-demand system.

BACKGROUND OF THE DISCLOSURE

The Internet is a global set of interconnected computer networks communicating via a protocol known as the Transmission Control Protocol and Internet Protocol (TCP/IP). The World Wide Web (WWW) is a fully distributed system for sharing information that is based upon the Internet. Information shared via the WWW is typically in the form of HyperText Markup Language (HTML) "pages" or documents. HTML pages, which are associated with particular WWW logical addresses, are communicated between WWW-compliant systems using the so-called HyperText Transport Protocol (HTTP). HTML pages may include information structures known as "hypertext" or "hypertext links." Hypertext, within the context of the WWW, is typically a graphic or textual portion of a page which includes an address parameter contextually related to another HTML page. By accessing a hypertext link, a user of the WWW retrieves the HTML page associated with that hypertext link.

Most user interfaces to the WWW are graphical in nature and, therefore, require a considerable degree of computational power. For example, WWW "browsers" from companies such as Microsoft® and Netscape® require relatively powerful personal computers running sophisticated operating systems. These personal computer systems are relatively expensive, hard to maintain and intimidating to consumers unfamiliar with computer interfaces.

Video on demand (VOD) systems have been developed that employ massive computing power for the interactive delivery of video information to subscribers using, e.g., cable television networks. A typical VOD system includes a high bandwidth forward channel for delivery of video and/or audio programming in a standard analog format (e.g., NTSC, PAL, SECAM) or a standard digital format (e.g., MPEG, MPEG2). A low bandwidth back channel allows a subscriber to interact with the video server to control video delivery options, such as video selection or other programming options. Newly developed VOD systems, such as DIVA Systems Corporation's On-Set interactive digital video service, provide subscribers with an easy to use on-screen user interface and, due to a high speed back channel, a low-latency interactive experience. However, such systems are designed to deliver interactive video and have not heretofore been used to distribute WWW information.

Therefore, a method and apparatus for interactively accessing information from the WWW suitable for use in an interactive information distribution system, illustratively a cable television system or a video on demand system, is seen to be desirable.

SUMMARY OF THE INVENTION

The invention is a method and apparatus for interactively accessing information from the WWW suitable for use in an interactive information distribution system, illustratively a cable television system or a video on demand system.

Specifically, a video server receives, via a back channel, a request from a subscriber for an information page having an associated Internet protocol address. A computer associated with the video server provides access to the WWW via, e.g., a high-speed communication link. The computer retrieves the requested information page from an information source associated with the Internet protocol address, converts the retrieved information page into an MPEG-like information frame, and provides the MPEG-like information frame to the requesting subscriber via a forward information channel. In the case of a standard (i.e., non-MPEG-like) video on demand system, the information page and any associated menu structure is combined in a standard manner and coupled to the subscriber as, illustratively, an encrypted or unencrypted analog video signal.

In a video on demand system having a limited capacity user interface, an associated hypertext menu structure is provided to the subscriber along with the requested page. The computer generates the menu by parsing the retrieved information page to identify hypertext information structures. Identified hypertext information structures are mapped into a menu structure. The menu, and any optional navigation (i.e., browser) commands, are included within the MPEG-like information frame(s) provided to the subscriber.

In a video on demand system storing and disseminating information according to various storage and access optimization techniques, the MPEG-like information frame may be subjected to the appropriate techniques and stored in an appropriate format. In this case, the MPEG-like information frame is processed and stored in a video on demand mass storage medium prior to transmission via the forward information channel.

The computer is capable of identifying dynamic information structures within the retrieved information page, such as applets or moving images. Applets are executed by the computer such that the subscriber may dynamically interact with the applet and view the results as if the applet were running on a subscriber's set top terminal. Moving images, such as moving icons, graphics, advertising banners, audiovisual "clips" and the like are also provided to the user as part of an MPEG-like information stream carried by the forward information channel.

The computer includes caching and pre-fetch operations. In a cache mode of operation, the computer stores commonly-retrieved HTML pages, and pages waiting to be sent to a subscriber, in a high capacity memory unit as HTML source code or as video information. In a pre-fetch mode of operation, the computer retrieves the pages associated with the hypertext information structures identified during a parsing operation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
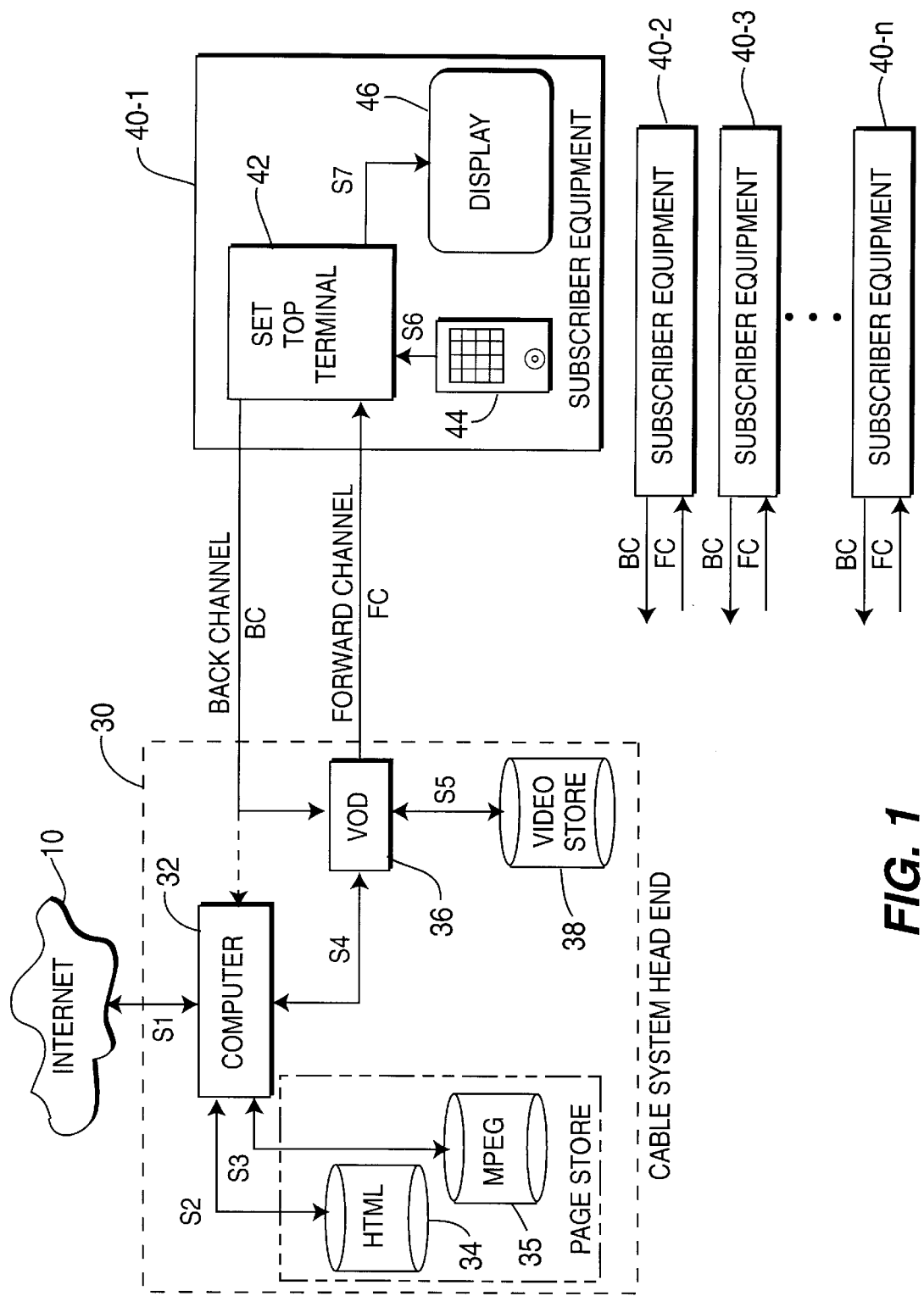
FIG. 1 shows a block diagram of an interactive information distribution system including the invention.

FIG. 1 depicts an interactive information distribution system suitable for use with the invention. Specifically, a cable system head end 30 interacts with a plurality of subscriber equipment 40-1 through 40-n via a forward channel FC and a back channel BC. The cable system head end 30 includes a video on demand (VOD) server 36 coupled to a video storage unit 38 by a signal path S5. VOD server 36 receives requests for audiovisual programs from subscribers via the back channel BC, illustratively a quadrature phase shift keying (QPSK) channel or a public telecommunication channel. In response to a subscriber request, VOD server 36 retrieves the requested audiovisual program from the video storage unit 38 and, if necessary, converts the retrieved audiovisual program into an appropriate transport format, such as the known MPEG1, MPEG2, Asynchronous Transfer Mode (ATM) or similar transport formats. The audiovisual program is then transported to the appropriate subscriber via the forward channel FC, illustratively a Quadrature Amplitude Modulation (QAM) transmission channel. It should be noted that the forward channel FC and the back channel BC may be carried by a common fiber or cable network at mutually exclusive spectral regions. The forward channel FC and back channel BC may also be carried by distinct communications networks. For example, the forward channel FC may be carried by a cable, satellite or terrestrial broadcast network, while the back channel BC may be carried by a telecommunications network. In the case of a standard (i.e., non-MPEG-like) video on demand system, the information page and any associated menu structure is combined in a standard manner and coupled to the subscriber as, illustratively, an encrypted or unencrypted analog video signal.

The VOD server 36 inserts a terminal identification (TID) parameter within the information stream. Subscribers receiving the information stream compare the inserted TID parameter to a TID parameter locally stored in the subscriber equipment. If the inserted and locally stored TIDs match, then the subscriber decodes the received information stream. Additionally, various security-related algorithms, such as public and private key encryption or validation routines may be utilized within the VOD system to ensure that a only the appropriate subscriber receives the requested audiovisual program. One embodiment of a VOD system suitable for use in the system of FIG. 1 is described in U.S. Pat. No. 5,671,377, issued Sep. 23, 1997, entitled SYSTEM FOR SUPPLYING STREAM OF DATA TO MULTIPLE USERS BY DISTRIBUTING A DATA STREAM TO MUPLTIPLE PROCESSORS AND ENABLING EACH USER TO MANIPULATE SUPPLIED DATA STREAM, and incorporated herein by reference in its entirety.

The subscriber equipment 40 contains a set top terminal 42, an input device 44, and a display device 46. A set top terminal suitable for use in the system of FIG. 1 is described in U.S. patent application Ser. No. 08/950,505, for SET TOP TERMINAL FOR AN INTERACTIVE INFORMATION DISTRIBUTION SYSTEM, and incorporated herein by reference in its entirety. The set top terminal 42 receives and demodulates the information stream transmitted by the VOD server 36. The set top terminal may, optionally, demodulate standard cable television signals received from the VOD server 36. Thus, a single set top terminal can be used to receive all the cable services provided by the network. The set top terminal also transmits information, such as subscriber requests, to the cable system head end 30 via the back channel BC.

The set top terminal 42 includes a microprocessor and various support circuitry (not shown). The set top terminal 42 is responsive to the input device 44 to provide interactive control of the information provided by the VOD server 36. The provided information is controlled by a subscriber via the input device 44, e.g., an infrared (IR) or radio frequency (RF) remote control unit. The provided information, e.g., audio, video, still photographs, graphics and the like are portrayed on the display device 46 such as a television, video monitor, and the like.

The VOD system described thus far operates in a known manner to provide audiovisual programming to subscribers in response to subscriber requests for such programming. The invention will now be described within the context of the interactive information distribution system of FIG. 1.

In the cable system head end 30 of FIG. 1, the VOD server 36 is coupled to a computer 32 via data path S4. The computer 32 is connected to the Internet 10 via high-speed communication link S1, illustratively a T1 or T3 communications channel. The computer receives information requests and commands from subscribers via signal path S4. The computer 32 is optionally coupled directly to the back channel BC, in which case the computer 32 may be configured to receive information requests and commands from subscribers via either signal path S4 of the back channel BC. Subscriber requests pertaining to audiovisual programming stored in video storage unit 38 are processed by the VOD server 36 in the manner previously described. Subscriber requests pertaining to the WWW are processed by the VOD server 36 and computer 32, as will now be described.

The interactive information delivery system of FIG. 1 has two primary modes of operation. In a VOD mode of operation, the system operates as a video on demand server. In this mode, the video on demand system receives a subscriber request via a back channel BC, e.g., a request for a particular movie. The request is processed by video on demand server 36 which retrieves requested program from video store unit 38 and transmits the requested program to the subscriber via forward channel FC.

In a WWW mode of operation, a subscriber sends a request for a particular web page to the head end 30 via the back channel BC. The subscriber request is received and processed by either the VOD server 36 and/or the computer 32. The VOD server 36, if used to receive WWW mode requests, transfers those requests to the computer 32 via signal path S4. The VOD server 36 treats such requests as video program requests, and treats the computer 32 as a source of the requested video program. The computer 32 is coupled to the Internet 10 via high speed communications link S1. The computer 32 may optionally receive subscriber requests via a direct connection to the back channel BC; however, such a direct connection is only feasible in a system having a back channel physically distinct from the forward channel (e.g., a satellite forward channel FC and a telecommunication back channel BC).

The WWW mode of operation will be described in more detail below with respect to FIGS. 3–4. Briefly, the computer 32 retrieves the requested WWW page from the Internet 10; stores a copy of the page in HTML storage unit 34; parses the page to identify hypertext links (and other information structures); converts the HTML page to a "video page" (i.e., a video formatted version of the page) and, optionally, stores a copy of the video page in MPEG storage unit 35. The computer 32 also generates a "menu page" associated with at least the identified hypertext links. The computer 32 combines the menu page and video page and, if necessary, converts the combined page into, illustratively, an MPEG2 bitstream. The MPEG2 bitstream is then coupled to VOD server 36 via signal path S4. VOD server 36 subsequently transmits the requested WWW page (in MPEG2 format) to the appropriate subscriber via the forward channel FC. It should be noted that the MPEG2 (or other format) bitstream coupled to VOD server 36 may be stored in MPEG storage unit 35 instead of the above-described video page.

Figure 5:
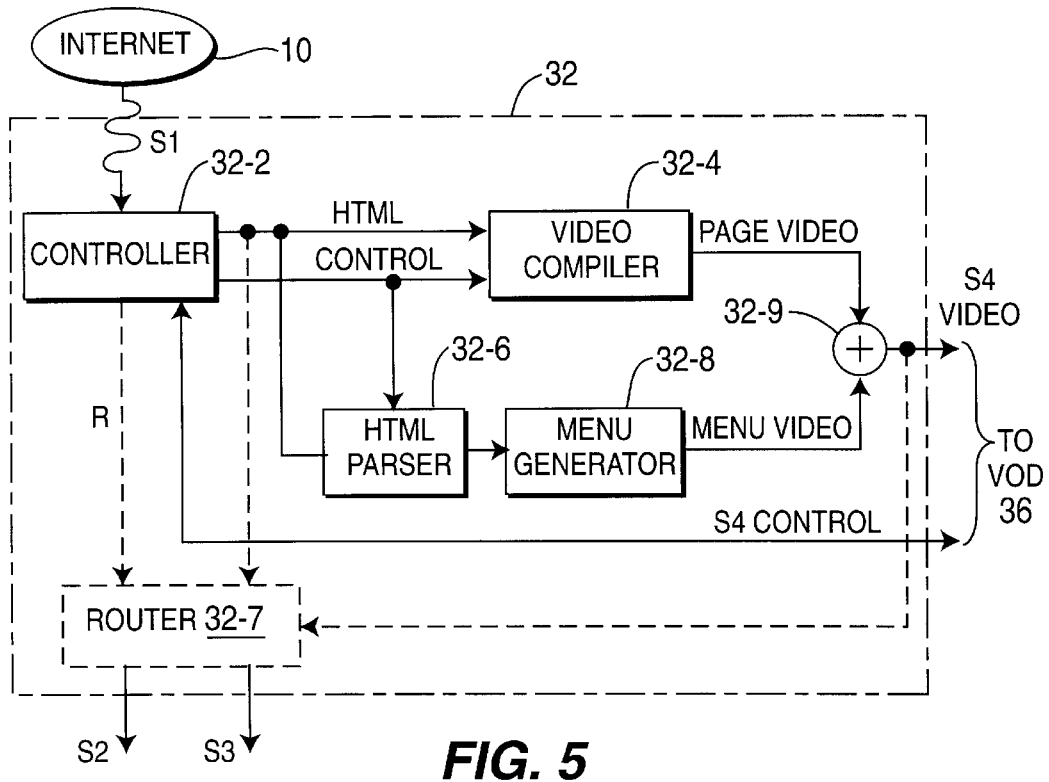
FIG. 5 shows a high level block diagram of a computer suitable for use in the interactive information distribution system of FIG. 1.

The WWW page may also be stored in the video storage unit 38 prior to the transmission of the WWW page to a subscriber via the forward information channel. For example, some video on demand systems store video information in a manner facilitating rapid search and retrieval of data. In the above-reference U.S. Pat. No. 5,671,377, a technique known as "striping" is used to divide video (and other) information into a plurality of information "stripes" that are stored across a plurality mass storage units under control of associated processing units in a massively parallel processing system. Thus, to utilize the advantages of the striping technique, the retrieved WWW page is modified and stored in the video storage unit according to the striping technique prior to transmission to a subscriber via the forward channel FC. In such a system, video store unit 38 may comprise, e.g., an array of mass storage units optimized to rapidly disseminate information to, e.g., a plurality of users. FIG. 5 shows a high level block diagram of a computer 32 suitable for use in the interactive information distribution system of FIG. 1. Specifically, FIG. 5 shows an interface controller 32-2 responsive to a control signal S4-CONTROL from the VOD server 36. The interface controller 32-2 retrieves HTML pages from the Internet 10 via communications link S1. The retrieved pages are coupled through controller 32-2 to a video compiler 32-4 and an HTML parser 32-6. The video compiler 32-4 produces an "page video" MPEG2 bitstream that, when decoded and viewed on a display device, will look substantially the same as the retrieved HTML page viewed using a standard WWW graphical browser. The HTML parser 32-6 extracts hypertext links from the retrieved HTML page. The extracted links are coupled to a menu generator 32-8 that produces a "menu video" associated with the page video produced by video compiler 32-4. The page video and menu video signals are combined by an integrator 32-10 to produce an output video signal S4-VIDEO. A control signal CONTROL is coupled from interface controller 32-2 to video compiler 32-4 and HTML parser 32-6. The video compiler 32-4, in response to the control signal CONTROL, adjusts the size of the viewing area of a retrieved HTML page included within the page video. The HTML parser, in response to the control signal CONTROL, adjusts the contents of the menu video to reflect the hypertext links actually included in the page video.

Thus, the interactive information distribution system of FIG. 1 includes two important characteristics. First, HTML pages are represented as video. By turning HTML screen representations into video clips, current VOD hardware and software are used to deliver WWW pages to subscribers. This is accomplished using an HTML-to-MPEG 2 video compiler. Second, the hyperlink pointers embedded in HTML pages are detected and translated into menus having the same style as menus already used in subscribers set top terminals. These menus allow WWW "browsing" without requiring keyboards in the home. This is accomplished using an HTML parser and an associated menu generator. The HTML parser, menu generator and video compiler may be implemented in software, hardware or a combination of software and hardware.

The system of FIG. 1 optionally implements WWW page-caching and pre-fetching modes in the WWW mode of operation. In the cache mode of operation, the computer 32 stores, in HTML storage unit 34 and/or MPEG storage unit 35, pages from web sites that are known to be both popular and slow (e.g., due to the nature of the content, large numbers of current user accesses, slowness of the intervening communication channels and the like). The pages are cached on behalf of all the system subscribers (i.e., a page cached because of user A's access pattern may also be used on behalf of user B). This caching feature reduces the expected delay to subscriber's request to level that, in many cases, will be faster than for conventional personal computer-based Internet access. In a pre-fetch mode of operation, the computer retrieves WWW pages associated with the hypertext information structures identified during the parsing of the requested WWW page. The pre-fetching mode takes advantage of the tree-like user access pattern typical for hyperlink systems to pre-fetch pages before they are needed.

In one embodiment of the invention, the computer 32 of FIG. 5 optionally includes a router 32-7 that communicates with the controller 32-2 via a signal path R. Specifically, router 32-7 receives the HTML signal HTML and the combined page and menu video signal S4-VIDEO. Router 32-7, in response to a command transmitted by the controller 32-2, couples one or both of the received signals, HTML and S4-VIDEO, to, respectively HTML storage unit 34 or video (e.g., MPEG) storage unit 35. Alternatively, the controller 32-2 may be used to couple HTML signals directly to the HTML storage unite 34.

Figure 2:
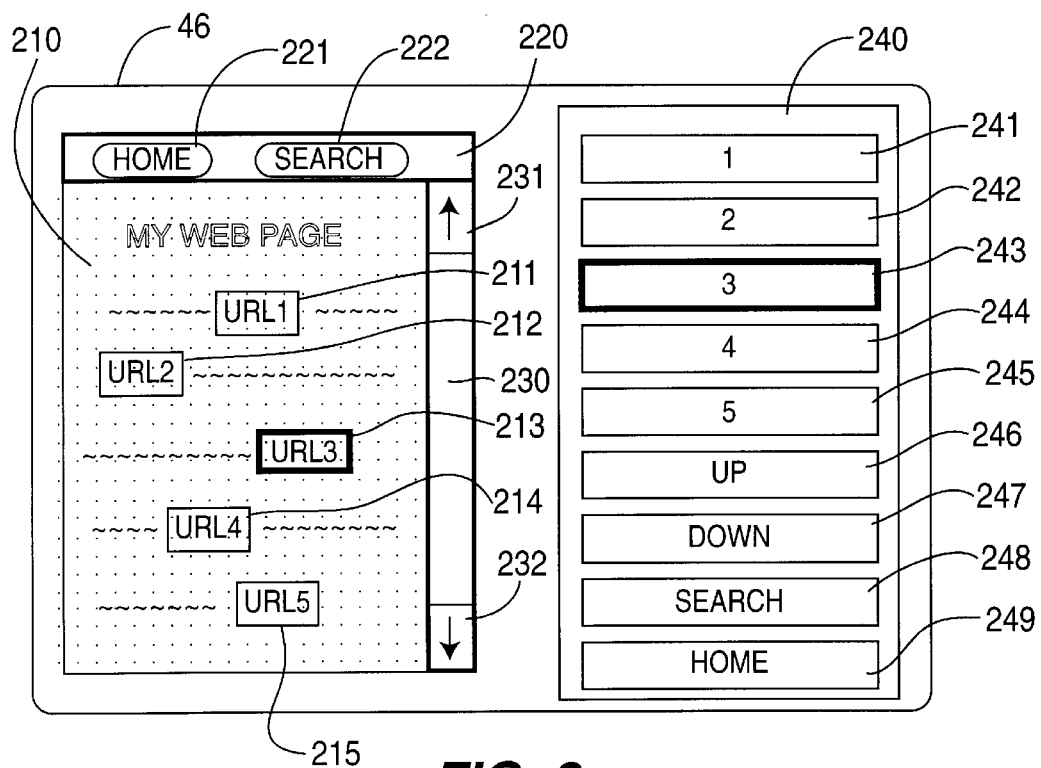
FIG. 2 shows an on-screen display suitable for use by a subscriber to the interactive information distribution system of FIG. 1.

FIG. 2 shows an on-screen display suitable for use by a subscriber in the interactive information distribution system of FIG. 1. Specifically, FIG. 2 depicts an on-screen display comprising a viewing window 210 bounded by a horizontal icon bar 220 and a vertical icon bar 230. The on-screen display also comprises a menu 240 associated with an HTML page displayed within the viewing window 210. The displayed HTML page is substantially the same as an HTML page retrieved by the computer 32 from the Internet 10. However, it must be noted that the length of an HTML page is not usually restricted in any way, and that the quality (e.g., size, resolution, scan rate) of the display 46 utilized by a subscriber may vary. Thus, to ensure that the displayed page is clearly visible in the viewing window 210, it is typically necessary to show only a portion of the page.

The on-screen display of FIG. 2 depicts a "side-by-side" arrangement (i.e., vertical tiling) of viewing window 210 and menu 240. This arrangement maximizes the number of lines viewable within viewing window 210. The on-screen display may be modified to produce an "over-under" arrangement (i.e., horizontal tiling), thereby maximizing the number of columns viewable within viewing window 210. A subscriber may adjust the window tiling and resolution of the material displayed within the viewing window 210 by transmitting a subscriber request indicating that a finer or courser page resolution is desired or that the tiling should be changed. Moreover, the a user may scroll the viewable window by sending UP or DOWN subscriber requests.

In subscriber equipment having a limited capacity user interface (e.g., the inability to select on-screen items using, e.g. a mouse or other pointing device) the associated hypertext menu structure depicted as menu 240 is provided to the subscriber along with the requested page. The server10 side computer generates the menu structure by parsing the retrieved information page to identify hypertext information structures. Identified hypertext information structures are mapped into a menu structure. The menu, and any optional navigation (i.e., browser) commands, are included within the MPEG-like information frame(s) provided to the subscriber.

A requested HTML page may include static and dynamic information structures. Static information structures are structures that are not intended to change after being loaded by a subscriber, illustratively, graphics, icons, text and hypertext information structures. Dynamic information structures are structures that are intended to change after being loaded by a subscriber, illustratively, static information structures modified by applets, and moving graphics, icons, text or hypertext structures. For simplicity, the displayed information structures depicted in FIG. 2 are only static structures, namely uniform resource locators (URLs) URL1–URL5 (i.e., hypertext links 211–215) in viewable page 210, HOME icon 221 and SEARCH icon 222 in horizontal icon bar 220, and UP arrow 231 and DOWN arrow 232 in vertical icon bar 230.

The computer is capable of identifying dynamic information structures within the retrieved information page, such as applets or moving images. Applets are executed by the computer such that the subscriber may dynamically interact with the applet and view the results as if the applet were running on a subscriber's set top terminal. Moving images, such as moving icons, graphics, advertising banners, audio-visual "clips" and the like are also provided to the user as part of an MPEG-like information stream carried by the forward information channel.

Figure 3:
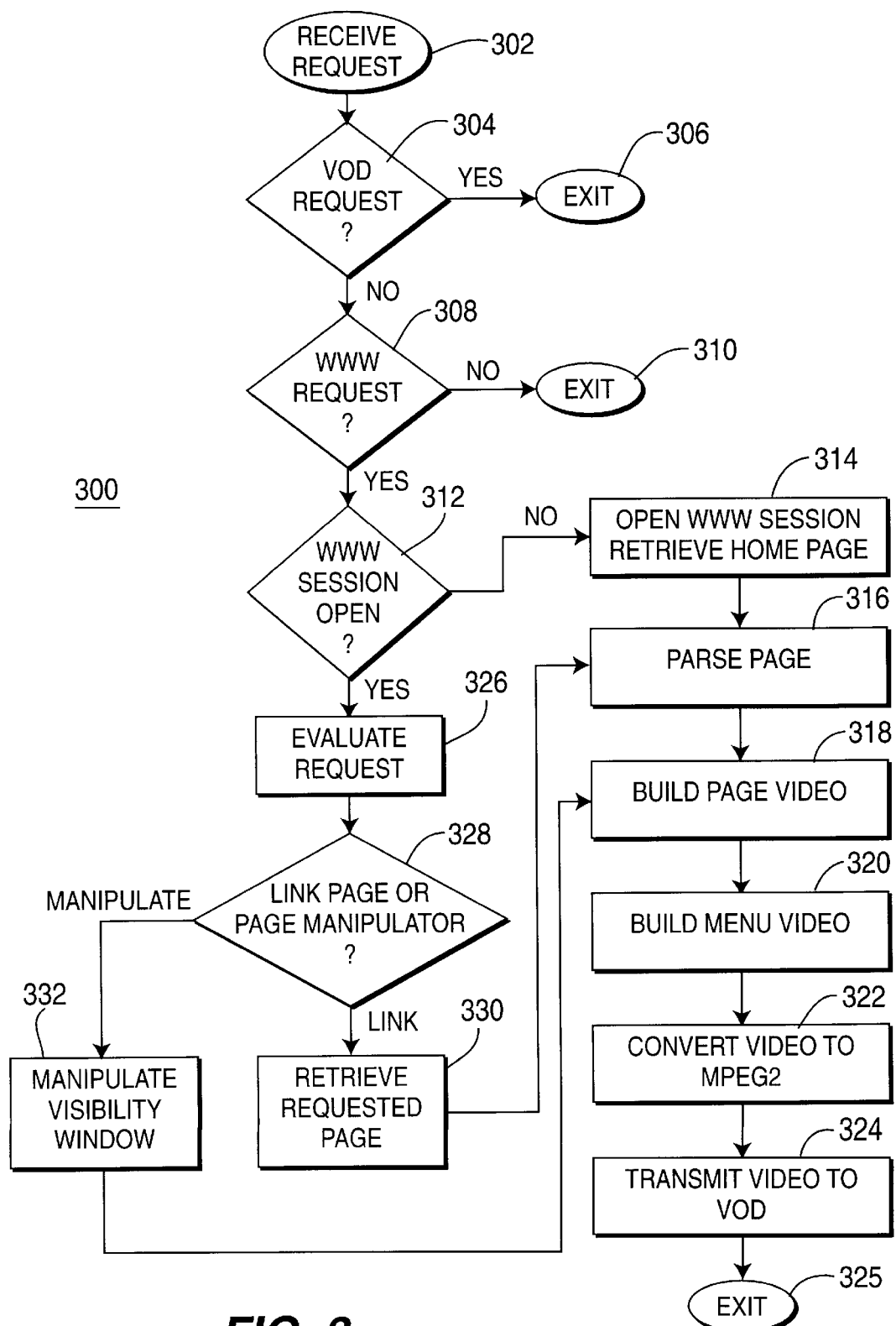
FIG. 3 shows a flow diagram of a server-side request processing routine.

FIG. 3 shows a flow diagram of a server-side request processing routine suitable for use in the computer 36 in the system of FIG. 1. The routine 300 of FIG. 3 is part of a larger routine (not shown) which enables interactive distribution of information to a subscriber. The routine 300 depicts a basic processing structure related to accessing WWW pages in an interactive information distribution system.

The routine 300 is entered at step 302, when the computer receives a request from a subscriber via the back channel BC. At step 304, the request is evaluated and a query is made as to whether the request is a standard video on demand server request. If the query of step 304 is answered affirmatively, the routine 300 proceeds to step 306 and the routine is exited. If the query of step 304 is answered negatively, the routine 300 proceeds to step 308. At step 308, the request is evaluated to see if it pertains to a WWW request. If the answer to the query of step 308 is answered negatively, the routine 300 proceeds to step 310 and the routine is exited. If the query of step 308 is answered affirmatively, then the routine proceeds to step 312. At step 312, a query is made as to whether a WWW session is presently open. If the query of step 312 is answered negatively, the routine 300 proceeds to step 314. If the query of step 312 is answered affirmatively, the routine 300 proceeds to step 326.

As step 314, the computer 32 opens a new WWW session for the subscriber that sent the request received at step 302. Since a WWW session is not open, per the query of step 312, it is assumed that the request from the subscriber is intended to initiate a new WWW session. Thus, the computer 32 retrieves a pre-designated HTML home page from the Internet 10 via communications link S1 or, alternatively, from HTML storage unit 34 or MPEG page storage unit 35). After retrieving the home page from the Internet 10, the routine 300 optionally stores the HTML page in the HTML storage unit 34 and proceeds to step 316. At step 316, the retrieved page is parsed to identify text portions, graphics portions, hypertext portions, applets and any other information structures contained within the HTML page.

The routine 300 then proceeds to step 318, where a "page video" is built utilizing the parsed HTML page. The built video page will, when displayed, look substantially the same as the retrieved HTML page viewed using a standard WWW graphical browser. However, since an HTML page can be very long, it may be necessary to provide only a portion of the HTML page to a subscriber for viewing. This is necessary to insure legibility on the display screen 46 of the subscriber's equipment 40. Thus, the page of video built at step 318 may be modified to ensure that the subscriber can comfortably view the page on, e.g., a standard television display.

The built video page will comprise static information structures and, possibly, dynamic information structures. As previously discussed, static information structures are structures that are not intended to change after being loaded by a subscriber, illustratively, graphics, icons, text and hypertext information structures. Dynamic information structures are structures that are intended to change after being loaded by a subscriber, illustratively, static structures modified by applets, and moving graphics, icons, text or hypertext structures.

The portion of the built page comprising only static information structures includes location indicia that is used to mark the position of any dynamic information structures. The dynamic information structures are converted into video "clips" that are merged into the built video page at the appropriate locations.

The routine then proceeds to step 320, where a "menu video" is built using the identified hypertext portions of the parsed HTML page included within the page video built at step 318. At step 322, the page video and the menu video (and, optionally, the dynamic information video clips) are combined together and converted into an analog video signal (e.g., an NTSC, PAL or SECAM) or a digital video signal (e.g., MPEG-1 or MPEG-2). The routine 300 optionally stores some or all of the combined video in MPEG storage unit 35 and proceeds to step 324. At step 324, the combined and converted video signal (or video stream) is transmitted to VOD server 36 via signal path S4. The VOD server 36 subsequently transmits the video signal (or video stream) to the appropriate subscriber in the same manner as a stored audio-visual program (from, e.g., video storage unit 38) is transmitted. The routine then proceeds to step 325, where the routine 300 is exited.

At step 326, the subscriber request is evaluated as a menu request and the routine 300 proceeds to step 328. At step 328, a query is made to determine if the menu request is a link request (i.e., corresponding to objects 211–215, or 221–222) or a page manipulation request (i.e., corresponding to objects 232–232). If the menu request evaluated at step 328 is a link request, then the routine 300 proceeds to step 330. At step 330, the computer 32 retrieves the HTML page associated with the hypertext link indicated by the subscriber link request. The routine 300 then proceeds to step 316. The routine 300 then proceeds through steps 318 to steps 325 as previously If the subscriber menu request evaluated at step 328 is a page manipulation request, then the routine proceeds to step 332. At step 332, the visible portion of the HTML page (i.e., the portion within viewing window 210) is shifted up or down in response to, respectively, UP or DOWN subscriber requests. The routine then proceeds to step 318 where the HTML page comprising the new visibility window is used to build a video page. The routine 300 then proceeds through steps 320 to steps 325 as previously described.

In one embodiment of the invention, step 318 is implemented by first storing the static information portion of the built page in a "scratch pad" memory (not shown). The stored static information comprises a background layer upon which the dynamic information structure video clips and the menu video are subsequently placed. The combined static, dynamic and menu video is then coupled to the subscriber as a video stream.

It must be noted that the video stream provided to the subscriber via the forward channel will need to be substantially continuous to avoid, e.g., decoder buffer underflow errors in an MPEG-like decoder. In addition, in the case of an analog video distribution system, typical televisions do not utilize sufficient local memory to store a video information stream longer than, e.g., a frame or two. Thus, the information provided to the subscriber via the forward channel FC will be substantially continuous in nature, while the information retrieved on behalf of the subscriber via the Internet connection S1 may be discontinuous or partially continuous (e.g., in the case of a streaming video portion of a web page being the only continuously updated portion of a previously retrieved page).

Figure 4:
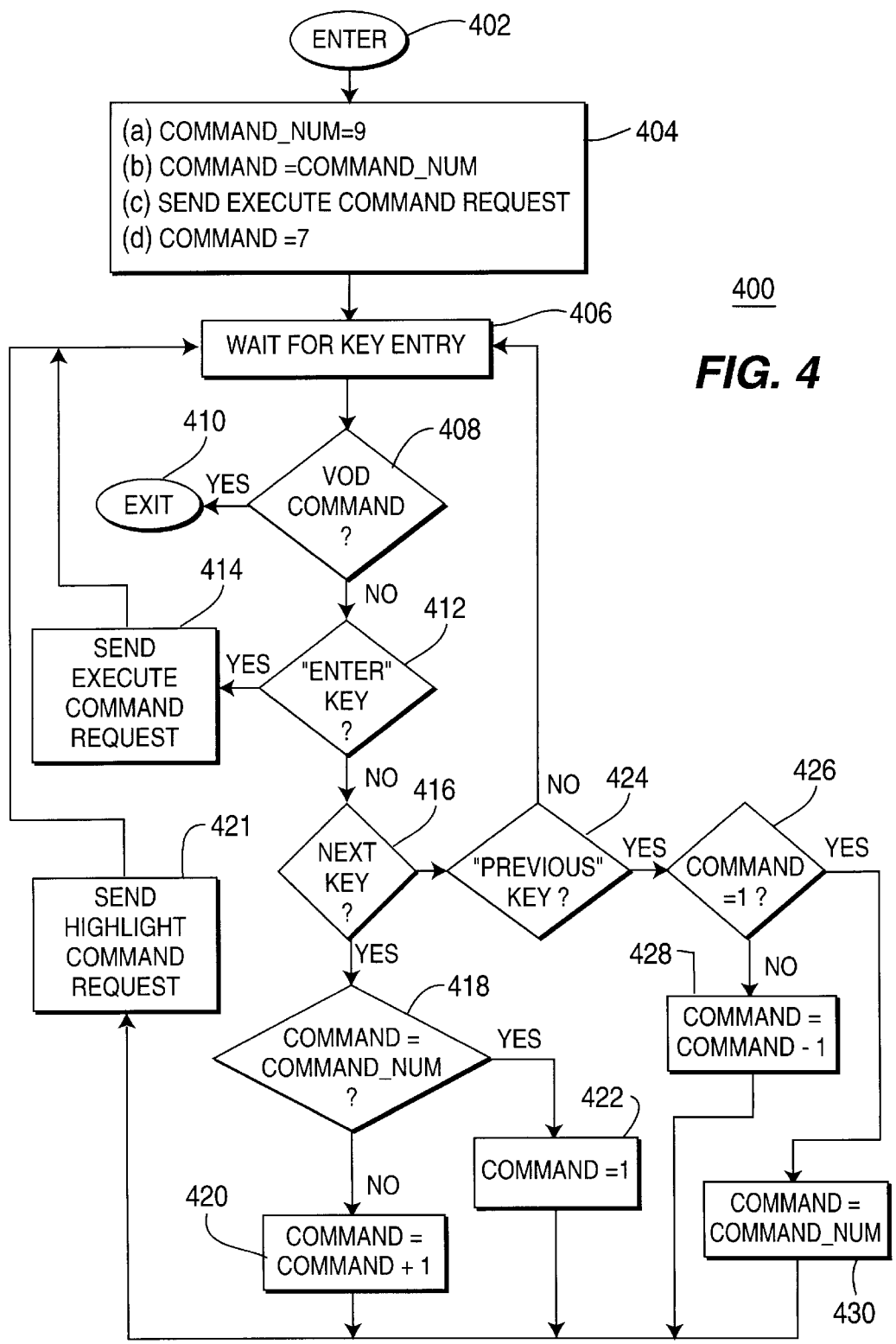
FIG. 4 shows a flow diagram of a subscriber-side request processing routine.

FIG. 4 shows a flow diagram of a subscriber-side WWW request processing routine suitable for use in a set top terminal 42 in the system of FIG. 1. The routine 400 of FIG. 4 is part of a larger routine (not shown) which enables remote operation of the set top terminal 42 by a user. The routine 400 depicts a basic command structure for initiating and conducting an interactive WWW session. The WWW session is controlled entirely by a user pressing one of three keys (i.e., ENTER, NEXT AND PREVIOUS) on the remote control unit 44. The ENTER key is used to execute a presently highlighted command. The NEXT key and PREVIOUS key are used to respectively increment and decrement the presently highlighted command. Commands may be highlighted using a local highlighting capability (i.e., a graphics overlay) or a remote highlighting capability (i.e., highlights generated by the VOD server 36 or computer 32).

The subscriber-side request processing routine 400 is entered at step 402, when a subscriber sends a request for an HTML page or otherwise causes a WWW session to be opened. The routine 400 proceeds to step 404 where a four step initialization routine is executed. Specifically, at step 404(a) an index variable COMMAND_NUM is set to nine, since the menu 240 of the exemplary on screen display of FIG. 2 is capable of supporting up to nine menu functions. The nine menu functions in the exemplary embodiment comprise, respectively, the five hypertext links 211–215 (represented by, respectively, menu selection items 241–245); the UP and DOWN keys (represented by, respectively, menu selections 246 and 247); and the SEARCH and HOME keys (represented by, respectively, menu selections 248 and 249). In addition, at step 404(b), a variable COMMAND is set to be equal to the COMMAND_NUM variable (i.e., nine). At step 404(c), a subscriber request to execute the presently selected COMMAND (i.e., nine) is then sent via the back channel BC to the computer 32 or VOD server 36. Finally, at step 404(d), the COMMAND variable is set to seven (i.e., DOWN).

After step 404 is executed, the computer 32 will retrieve an appropriate WWW home page, and transmit the home page and associated menu to the subscriber via the forward channel FC. Since the COMMAND variable has been set to seven (i.e., the DOWN command), the user may immediately scroll downward by pressing the ENTER key on the remote control 44.

The routine 400 then proceeds to step 406 where the set top terminal 42 waits for a key entry from remote control unit 44. Upon receipt of a key entry, the routine proceeds to step 408. At step 408 a query is made as to whether the key entered by the user is associated with a VOD command. If the query of step 408 is answered affirmatively, the routine proceeds to step 410 and routine 400 is exited. If the query of step 408 is answered negatively, the routine 400 proceeds to step 412. At step 412 a query is made as to whether the key entered by the user is an ENTER key. If the query of step 412 is answered affirmatively, the routine proceeds to step 414. At step 414, a subscriber request to execute the presently selected (i.e., highlighted) COMMAND is sent via the back channel BC to the computer 32 or VOD server 36. The routine then proceeds to step 406, where the set top terminal waits for the next key entry.

If the query of step 412 is answered negatively, the routine proceeds to step 416. At step 416 a query is made to determine if the key pressed is the NEXT key ("+", "NEXT FUNCTION", "INCREMENT" and the like). If the query of step 416 is answered affirmatively, the routine proceeds to step 418. At step 418 a query is made to determine if the present command variable is equal to the COMMAND_NUM index variable. If the query at step 418 is answered affirmatively, then the routine 400 proceeds to step 422 where the COMMAND variable is set to one (i.e., the menu command structure "rolls over"). If the query at step 418 is answered negatively, then the routine 400 proceeds to step 420, where the COMMAND variable is incremented by one. The routine 400 proceeds from either step 420 or step 422 to step 421.

If the query at step 416 is answered negatively, then the routine proceeds to step 424 where a query is made as to whether the key entry is a PREVIOUS key entry ("−", "PREVIOUS FUNCTION", "DECREMENT" and the like). If the query at step 424 is answered negatively, then the routine proceeds to step 406, effectively ignoring the key entry. In the exemplary embodiment, it is assumed that such a key entry is not related to either a WWW command or a VOD command. Such a non-related key entry may comprise, e.g., a local adjustment such as volume, picture, program input source and the like. If the query at step 424 is answered affirmatively, then the routine proceeds to step 426. At step 426 a query is made as to whether the present COMMAND variable equals one. If the query at step 426 is answered affirmatively, then the routine proceeds to step 430 where the COMMAND variable is set equal to the COMMAND_NUM variable (i.e., the menu command structure "rolls under"). If the query at step 426 is answered negatively then the routine proceeds to step 428 where the COMMAND variable is decremented by 1. The routine 400 proceeds from either step 428 or step 430 to step 421.

At step 421, a subscriber request to highlight the presently selected COMMAND is sent via the back channel BC to the computer 32 or VOD server 36. In the case of a set top terminal having a local highlighting capability (i.e., a graphics overlay), step 421 is implemented using the local capability. The routine then proceeds to step 406. In the case of a set top terminal lacking a local highlighting capability, the computer 32 or VOD server 36 may optionally process the subscriber request of step 421 by highlighting the icon or hypertext link associated with the presently selected COM- MAND. A WWW session may be terminated by, e.g., an explicit user command or time-out condition sensed by the computer 32 or VOD server 36.

There are several advantages to the interactive information distribution system of FIG. 1. First, a set top terminal in a subscriber's home need not comprise the complex (and costly) computing elements normally found in a traditional personal computers. This is because the only purpose of the set top terminal is the interactive selection and display of audiovisual programming and WWW pages.

Second, the cable system head-end 30 provides any necessary long-term storage capabilities required by the web browser (e.g., bookmarks, hot pages and the like). The cable system head-end 30 also provides any computing resources needed to operate downloaded client software, such as JAVA or ActiveX applets, the subscriber only views, e.g., the "dialog box" indicating the status or other visual result of the applet being processed, For example, in the case of a subscriber utilizing an on-line broker or merchant to buy securities or products, the broker or merchant may verify subscriber identification and other information via an applet that would be processed by the server on behalf of the subscriber. The subscriber would view and interactively respond to queries in a dialog box or other visual object, but the processing of the object and responses would be performed at the server. Thus, economies of scale inherent to a client-server architecture help reduce overall system costs, including the cost of supplying a WWW browsing application to a subscriber.

Third, since software running in the cable system head-end 30 controls the provided subscriber services, software updates and related issues are not a subscriber worry. Fourth, the cable system head-end 30 provides enhanced Internet security by selectively prohibiting access to web sites with undesirable information (e.g., adult material). It should be noted that an intrinsic security feature of the client server architecture described above is the complete isolation of a subscriber's home from computer viruses. Fifth, by using caching and pre-fetching techniques, the computer 32 and/or VOD server 36 attempts to have a requested HTML page on hand prior to a user's request for such a page. The information is stored either as either HTML data or video (i.e., MPEG2) data. Sixth, a key benefit of the architecture is that the investment in hardware already in place for a video on demand application can also be used for browsing the WWW, thereby enabling additional system functionality with little or no additional cost to a cable system operator.

It is estimated by the inventors that the additional computational load imposed upon the VOD server 36 and its associated computational hardware is less than 1% of the existing computational load. Additionally, the Internet service is designed so that it will degrade gracefully when the video request demands overload the VOD system. This graceful degradation is due to the fact that WWW surfers have traditionally been subjected to, and are aware of, latency problems within the Internet itself. As such, priority within the interactive information distribution system of FIG. 1 will be given to standard audiovisual programming subscriber requests (i.e., requests for movies, music and the like). By shifting the impact of service degradation to subscribers engaged in web browsing activities, the fundamental purpose of the video on demand system is preserved to a maximal degree.

The interactive information distribution system of FIG. 1 also provides a framework for collaborative activities within a closed group of subscribers. For example, to determine if a school is open on a snowy date, a set top terminal may be programmed to request an HTML page corresponding to a bulletin board operated by a local school board. The HTML page need not be stored on the Internet itself, though it certainly may be. Rather, the HTML page may be stored at the cable system head end 30 and disseminated only to those subscribers within the corresponding school district. In this manner, subscribers may gain instant access to particular community announcement information.

The system of FIG. 1 may also be used to send E-mail between subscribers within a particular VOD system or across Internet itself. Obviously, enhanced security for intra-system E-mail would be present. In addition, due to the server's knowledge of the source of a particular E-mail message (i.e., the subscriber sending a particular message), anonymous postings to bulletin boards can, if desired, be eliminated. Thus, topics of local interest may be discussed in a forum accessible by all subscribers to a system, and inappropriate use of the bulletin board may be tracked to its source.

It should be noted that the interactive information distribution system of FIG. 1 shows computer 32 receiving requests directly from subscribers 40-1 through 40-n via the back channel BC. However, computer 32 may also receive subscriber requests (and other requests and commands) from VOD server 36 via signal path S4. Moreover, the HTML and MPEG page store units 34, 35 may be integrated into video store unit 38. Additionally, computing resources within VOD server 36 may be utilized to connect to the TCP/IP network (or other networks). Thus, WWW pages may be retrieved from the HTML and MPEG page store cache units 34, 35, the VOD store unit 38 and the WWW itself (via computer 32).

Although various embodiments which incorporate the teachings of the present invention have been shown and described in detail herein, those skilled in the art can readily devise many other varied embodiments that still incorporate these teachings.

What is claimed is:

1. Information provider apparatus, comprising:

a video server for transmitting video information via a forward channel and receiving information page requests via a back channel; and a computer, coupled to said video server and a TCP/IP network, for retrieving information pages from said TCP/IP network, converting the retrieved information pages into a video signal, and coupling the video signal to the video server;

said computer comprising:

a controller, for retrieving said information pages from said TCP/IP network in response to a control signal;

a parser, coupled to said controller, for extracting hypertext information from said retrieved video page; and a menu generator, coupled to said parser, for generating a menu structure in response to said extracted hypertext information.

2. The apparatus of claim 1, wherein said computer further comprises:

a video compiler, coupled to said controller, for converting said retrieved information page into a page video signal; and a combiner, coupled to said video compiler and said menu generator, for combining said page video signal and said menu video signal into an output video signal.

3. The apparatus of claim 1, further comprising:
a page store unit, coupled to said computer, for storing a plurality of information pages.

4. The apparatus of claim 3, wherein said page store unit comprises at least one of:
an HTML storage unit, for storing said information pages in an HTML format; and
a video storage unit, for storing said information pages in a video format.

5. The apparatus of claim 3, wherein:
said page store unit controller, in response to hypertext information included within a requested information page, retrieves additional information pages, said additional information pages being associated with said included hypertext information; and
said controller, upon retrieving said additionally information pages, stores said additional information pages within said page store unit.

6. A method of interactively distributing information to a subscriber comprising the steps of:
receiving an information page request from said subscriber, said information page request including an internet protocol address;
retrieving said requested information page from an information source;
parsing said retrieved information page to identify static information structures forming said retrieved information page, said static information structures comprising graphic structures, text structures or hypertext structures;
generating first video information representative of said retrieved information page;
generating second video information, including menu information, representative of hypertext information structures included within said retrieved information page;
combining said first and second video information to form said video information stream; and
providing said video information stream to said subscriber via an information channel.

7. The method of claim 6, wherein:
said step of parsing also identifies dynamic information structures forming said retrieved information page, said dynamic information structures comprising applets or moving images;
said step of generating first video information includes the step of incorporating said dynamic information structures within said first video information; and
said steps of generating first video information, combining said first and second video information, and compressing said video information are repeated substantially in accordance with said dynamic information structures.

8. The method of claim 6, further comprising the steps of:
retrieving one or more information pages associated with said parsed hypertext information structures; and
storing, in a server memory, said one or more information pages associated with said parsed hypertext information structures.

9. A method for provide-side generation of a menu structure for use in an interactive video distribution system comprising provider equipment and limited capability subscriber equipment, comprising the steps of:
retrieving, from a TCP/IP network, a particular information page in response to a subscriber request;
parsing the retrieved information page to identify hypertext-like information structures;
generating a menu structure in response to said identified hypertext-like information structures;
merging, into a single video stream, the retrieved information page and the generated menu structure; and
transmitting, to said subscriber equipment via a forward channel, said merged video stream.

10. The method of claim 9, wherein said subscriber equipment comprises a set top terminal, said set top terminal generating, in response to a user input signal, said information page request, and generating, in response to said received video signal, an output signal suitable for use by a display device.

11. The method of claim 9, wherein said video signal carried by said forward channel is a compressed video signal.

12. The apparatus of claim 1, wherein said video information carried by said forward channel comprises compressed video information.

13. The apparatus of claim 1, wherein said apparatus receives requests for information from subscriber equipment via a back channel, said requested information pages being transmitted to said requesting subscriber equipment via said forward channel.

14. The apparatus of claim 13, wherein said subscriber equipment generates, in response to a user input signal, said information page requests and generates, in response to said received video information, an output signal suitable for use by a display device.

* * * * *